(12) United States Patent
Ranganathan et al.

(10) Patent No.: US 8,321,784 B1
(45) Date of Patent: Nov. 27, 2012

(54) REVIEWING OBJECTS

(75) Inventors: Sreedhar Ranganathan, Chennai (IN); Arun Koormamtharayil, Calicut (IN)

(73) Assignee: Adobe Systems Incorporated, San Jose, CA (US)

( * ) Notice: Subject to any disclaimer, the term of this patent is extended or adjusted under 35 U.S.C. 154(b) by 969 days.

(21) Appl. No.: 12/130,895

(22) Filed: May 30, 2008

(51) Int. Cl.
*G06F 17/00* (2006.01)

(52) U.S. Cl. ........ 715/255; 715/256; 715/751; 715/753; 715/758; 715/765

(58) Field of Classification Search .................. 715/255, 715/765
See application file for complete search history.

(56) References Cited

U.S. PATENT DOCUMENTS

| | | | |
|---|---|---|---|
| 5,040,142 A | 8/1991 | Mori et al. | |
| 5,892,900 A | 4/1999 | Ginter et al. | |
| 5,995,940 A | 11/1999 | Ramaley | |
| 6,243,722 B1 | 6/2001 | Day et al. | |
| 6,789,109 B2 | 9/2004 | Samra et al. | |
| 6,898,601 B2 | 5/2005 | Amado et al. | |
| 7,360,164 B2 | 4/2008 | Bjoernsen et al. | |
| 7,366,979 B2 | 4/2008 | Spielberg et al. | |
| 7,389,241 B1* | 6/2008 | Bascom | 705/35 |
| 7,555,557 B2 | 6/2009 | Bradley et al. | |
| 7,559,017 B2 | 7/2009 | Datar et al. | |
| 7,702,521 B2* | 4/2010 | Bascom | 705/1.1 |
| 7,783,154 B2 | 8/2010 | Wilkins et al. | |
| 7,818,678 B2* | 10/2010 | Massand | 715/751 |
| 2002/0129057 A1 | 9/2002 | Spielberg et al. | |
| 2003/0023755 A1 | 1/2003 | Harris et al. | |
| 2003/0182177 A1 | 9/2003 | Gallagher et al. | |
| 2003/0182206 A1* | 9/2003 | Hendrix et al. | 705/26 |
| 2004/0070594 A1* | 4/2004 | Burke | 345/716 |
| 2004/0085354 A1* | 5/2004 | Massand | 345/751 |
| 2004/0128144 A1* | 7/2004 | Johnson et al. | 704/278 |
| 2004/0172450 A1 | 9/2004 | Edelstein et al. | |
| 2004/0237032 A1 | 11/2004 | Miele et al. | |
| 2005/0086179 A1* | 4/2005 | Mehmet | 705/80 |
| 2005/0249374 A1 | 11/2005 | Levy | |
| 2006/0069605 A1 | 3/2006 | Hatoun | |
| 2006/0080432 A1* | 4/2006 | Spataro et al. | 709/224 |
| 2006/0100991 A1* | 5/2006 | Hartel et al. | 707/3 |
| 2006/0143558 A1* | 6/2006 | Albornoz et al. | 715/512 |
| 2006/0173803 A1 | 8/2006 | Morris | |
| 2006/0271836 A1* | 11/2006 | Morford et al. | 715/500.1 |
| 2007/0073776 A1 | 3/2007 | Kalalian et al. | |
| 2007/0118598 A1* | 5/2007 | Bedi et al. | 709/204 |
| 2007/0260996 A1* | 11/2007 | Jakobson | 715/781 |
| 2007/0297029 A1* | 12/2007 | Low et al. | 358/527 |

(Continued)

OTHER PUBLICATIONS

Quick Tip: Resize any Textbox or textarea, How-to-geek, Jun. 25, 2007, pp. 1-2 http://web.archive.org/web/20070625221627/http://www.howtogeek.com/howto/internet/firefox/quick-tip-resize-any-textbox-or-textarea-in-firefox/.*

(Continued)

*Primary Examiner* — Stephen Hong
*Assistant Examiner* — Mario M Velez-Lopez
(74) *Attorney, Agent, or Firm* — Robert C. Kowert; Meyertons, Hood, Kivlin, Kowert & Goetzel, P.C.

(57) ABSTRACT

Reviewing Objects. An example method includes generating a plurality of sections corresponding to an object. The plurality of sections includes a suggestion section and a support section. An input is received for at least one section of the plurality of sections. Further, one or more functions associated with the suggestion section are performed.

24 Claims, 7 Drawing Sheets

U.S. PATENT DOCUMENTS

| | | | |
|---|---|---|---|
| 2008/0077866 A1 | 3/2008 | Margulis | |
| 2008/0155615 A1 | 6/2008 | Craner et al. | |
| 2008/0177782 A1 | 7/2008 | Poston et al. | |
| 2008/0235597 A1 | 9/2008 | Schlesinger et al. | |
| 2009/0076843 A1 | 3/2009 | Graff et al. | |
| 2009/0097815 A1 | 4/2009 | Lahr et al. | |
| 2009/0164985 A1 | 6/2009 | Balko et al. | |
| 2009/0319885 A1 | 12/2009 | Amento et al. | |
| 2010/0017754 A1* | 1/2010 | Cafer | 715/835 |
| 2010/0095198 A1* | 4/2010 | Bultrowicz et al. | 715/234 |
| 2010/0138756 A1 | 6/2010 | Saund et al. | |
| 2010/0293027 A1 | 11/2010 | Du Fosse | |

OTHER PUBLICATIONS

Quick Tip: Resize any Textbox or textarea, How-to-geek, Jun 25 2007, pp. 1-2 http://web.archive.org/web/20070625221627/http://www.howtogeek.com/howto/internet/firefox/quick-tip-resize-any-textbox-ortextarea-in-firefox/.*

Track Changes and Comments and Microsoft Word; http://www.unc.edu/depts/wcweb/handouts/comments.html.

How to Use Microsoft Word's Commenting Features; http://www.cwrl.utexas.edu/node/56.

Commenting and markup tools overview; http://help.adobe.com/en_US/Reader/8.0/help.html?content=WSA13C481B-B0A1-41d5-ADDF-3C669541CA35.html.

Dummies.com, "Adding and Hiding Comments in Word 2007," downloaded via the Waybackmachine, Dec. 8, 2007-May 15, 2008, 2 pages.

Steve Johnson, "Microsoft Office Word 2007 on Demand," Feb. 13, 2007, Que, pp. 331-340.

"Track Changes & Comments in Microsoft Word", University of North Carolina Writing Center course handout, www.unc.edu/depts/wcweb 1998-2007, 4 pages.

"How to Use Microsoft Word's Commenting Features," http://www.cwrf.utexas.edu/node/56, 1998, 6 pages.

"Commenting and Markup tools Overview," http://help.adobe.com/en_US/Reader/8.0/help.html? content=WSA13C481B-B0A-41d5-ADDF-3C669541CA35.html, Jul. 2006, 2 pages.

Adobe Reader 8 User's Manual, Copyright © 2006 Adobe Systems Incorporated, 142 pages.

"Quick Tip: Resize any Textbox or textarea," How-to-geek, Jun. 25, 2007, pp. 1-2.

U.S. Appl. No. 12/361,343, filed Jan. 28, 2009, Adobe Systems Incorporated, all pages.

U.S. Appl. No. 12/395,197, filed Jan. 27, 2009, Adobe Systems Incorporated, all pages.

U.S. Appl. No. 12/395,314, filed Jan. 27, 2009, Adobe Systems Incorporated, all pages.

U.S. Appl. No. 12/395,390, filed Feb. 27, 2009, Adobe Systems Incorporated, all pages.

U.S. Appl. No. 12/472,916, filed May 27, 2009, Adobe Systems Incorporated, all pages.

Ron White, "How Computers Work," Oct.-2003, Que, 7th Edition, 136 pages.

Wikipedia, "Image Map," found at http://en.wikipedia.org/wiki/Image_map, last modified May 22, 2009, printed on May 27, 2009, 2 pages.

Woohoo, "Photoshop Panels: Integrated your ExtendScripts," Dec. 22, 2008, 4 pages.

* cited by examiner

REVIEWING OBJECTS

BACKGROUND

Over a period of time, the use of electronic documents has increased tremendously. An electronic document is prepared by an author and then circulated among reviewers for review. The electronic document is circulated in various ways, for example, through emails, posting on internet and uploading on server. Often, the reviewers reviewing the electronic document propose changes corresponding to various objects in the electronic document. The author then either incorporates the proposed changes or rejects the proposed changes. Implementing the proposed changes by writing them manually is tedious and leads to inefficiency.

Another problem that exists is that thoughts behind the proposed changes are not conveyed to the author. Hence, the author often rejects the proposed changes without taking into consideration the thoughts behind the proposed changes.

In light of the foregoing discussion there remains a need for a technique for reviewing objects efficiently.

SUMMARY

Embodiments of the invention described herein provide a method, system and machine-readable medium for reviewing objects.

An example method includes generating a plurality of sections corresponding to an object. The plurality of sections includes a suggestion section and a support section. An input is received for at least one section of the plurality of sections. Further, one or more functions associated with the suggestion section are performed.

Another example method includes presenting a document including an object. A proposed modification associated with the object is received. In response to receiving the proposed modification an element is presented. The element includes a first section displaying the proposed modification and a second section including a text input field. The element is graphically associated with the object. An explanation associated with the proposed modification is also received in the text input field.

Yet another example method includes receiving a document including an object. An element graphically associated with the object is then displayed. The element includes a first section displaying the proposed modification and a second section displaying an explanation associated with the proposed modification.

An example machine-readable medium includes instructions operable to cause a programmable processor to perform generating a plurality of sections corresponding to an object. The plurality of sections includes a suggestion section and a support section. An input is received for at least one section of the plurality of sections. Further, one or more functions associated with the suggestion section are performed.

An example system includes a suggestion section for receiving one or more suggestions corresponding to an object. Further, the system includes a support section associated with the suggestion section for receiving a support for the one or more suggestions.

Another example system includes a generation module for generating a plurality of sections corresponding to an object. The plurality of sections includes a suggestion section and a support section. Further, the system includes a performing module for performing one or more functions associated with the suggestion section.

DETAILED DESCRIPTION OF EMBODIMENTS

Figure 1:
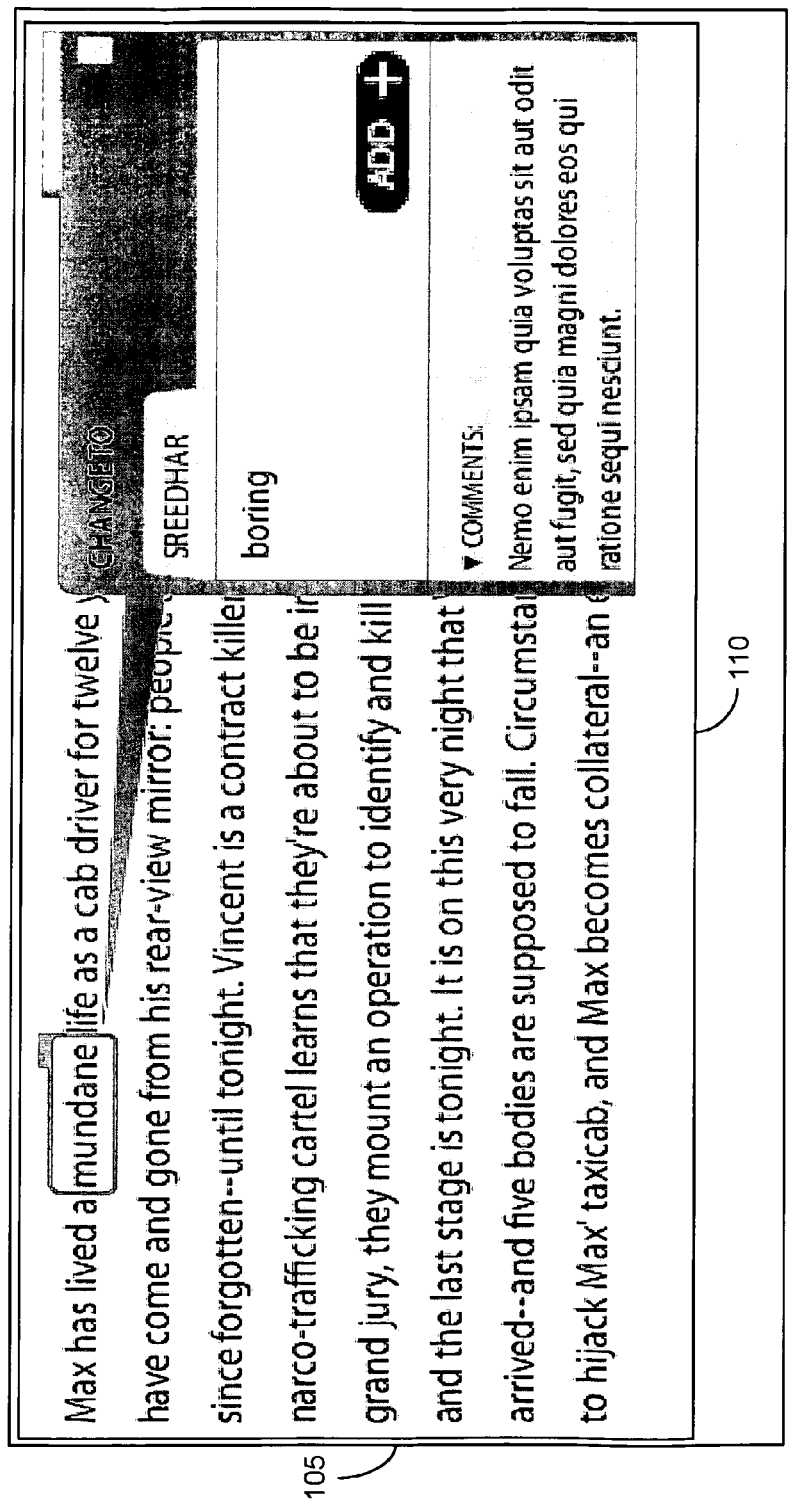
FIG. 1 is a block diagram of an environment in accordance with an embodiment of the invention.

FIG. 1 is a block diagram of an environment 100 in accordance with an embodiment of the invention. Environment 100 includes a system 105 with an exemplary application 110 running on system 105. System 105 may be a processing device. Examples of system 105 include but are not limited to computers, laptops, Personal Digital Assistants (PDAs) and mobile devices.

In an embodiment of the invention, application 110 includes a word processing application, for example, Acrobat®. In another embodiment of the invention, application 110 includes a graphical or imaging application, for example, Photoshop® and Acrobat®. In yet another embodiment of the invention, application 110 includes a video application or a video compatible application, for example, Acrobat® and Adobe® Premiere® Pro CS3. In still another embodiment of the invention, application 110 includes any application in which it is desirable to edit objects, review the objects, comment on the objects or propose any changes to the objects.

In an embodiment of the invention, an object includes a visible or an audible entity which is acted upon. Examples of the object include but are not limited to textual element, graphical element, two dimensional element, three dimensional element, drawing, image, video element, audio element, multimedia presentations, complete or part of any electronic document, and any other entity included in the electronic document.

The object may be present in any electronic format, for example, the electronic document, video format, audio format, presentations, postings on internet, an email or any word processing format. In an embodiment of the invention, the electronic format includes a portable document format (PDF).

It will be appreciated that the objects may be written, inserted, imported, drawn, copied or provided to application 110.

In an embodiment of the invention, the electronic format including the object is created by a user, for example, an author or object creator and made accessible to one or more reviewers through a network. Examples of network include but are not limited to local area network (LAN), wide area network (WAN), metropolitan area network (MAN), wired network, and wireless network.

It will also be appreciated that the electronic format may be circulated using, for example, emails, posted on the internet or the like. The user may save and share the electronic format on a server or may share through web applications.

In an embodiment of the invention, application 110 provides an option to a user to enable reviewing of objects, for example, by selecting an option, for example, "Review", "Insert Hybrid Comment", "Hybrid Commenting" or "Change To". The selection of the option then results in display of a hybrid commenting element. The hybrid commenting element is explained in detail in conjunction with FIGS. 2a, 2b and 2c.

Figure 2A:
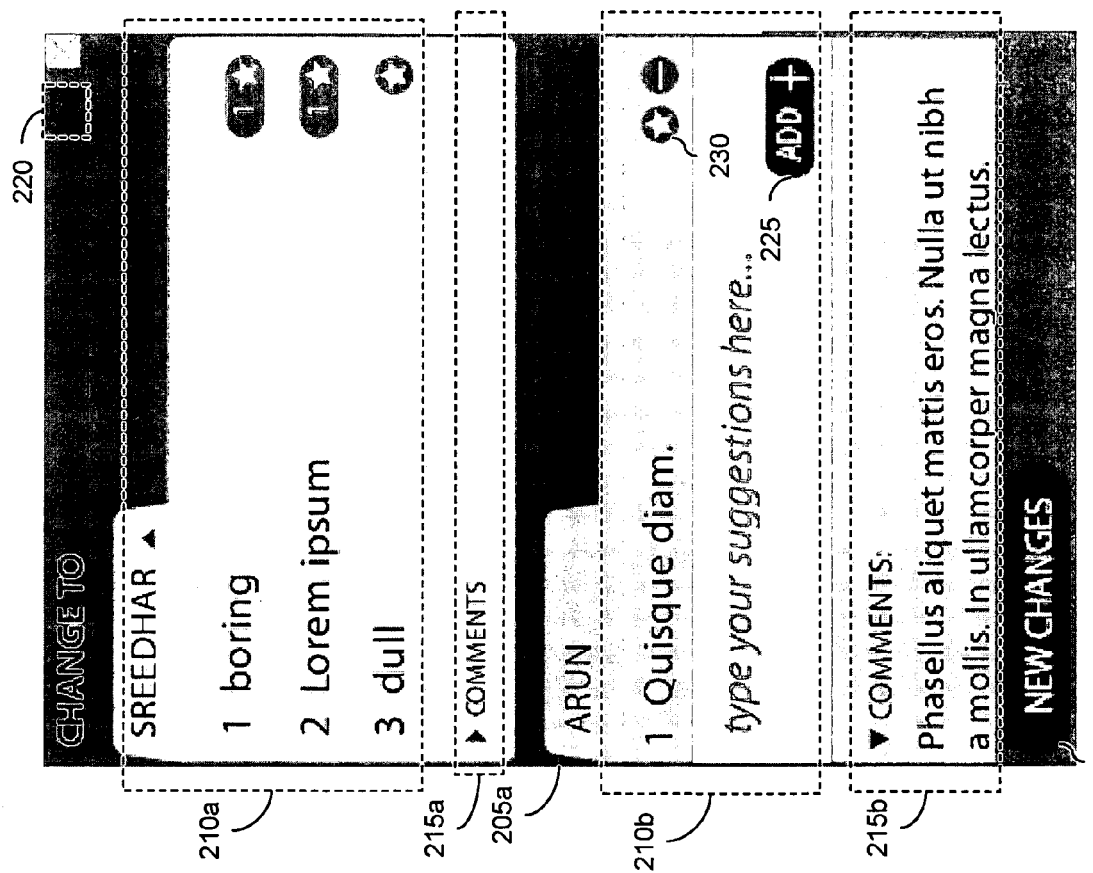
FIGS. 2a, 2b and 2c are exemplary representations of hybrid commenting elements in accordance with an embodiment of the invention.
Figures 2B, 2C:
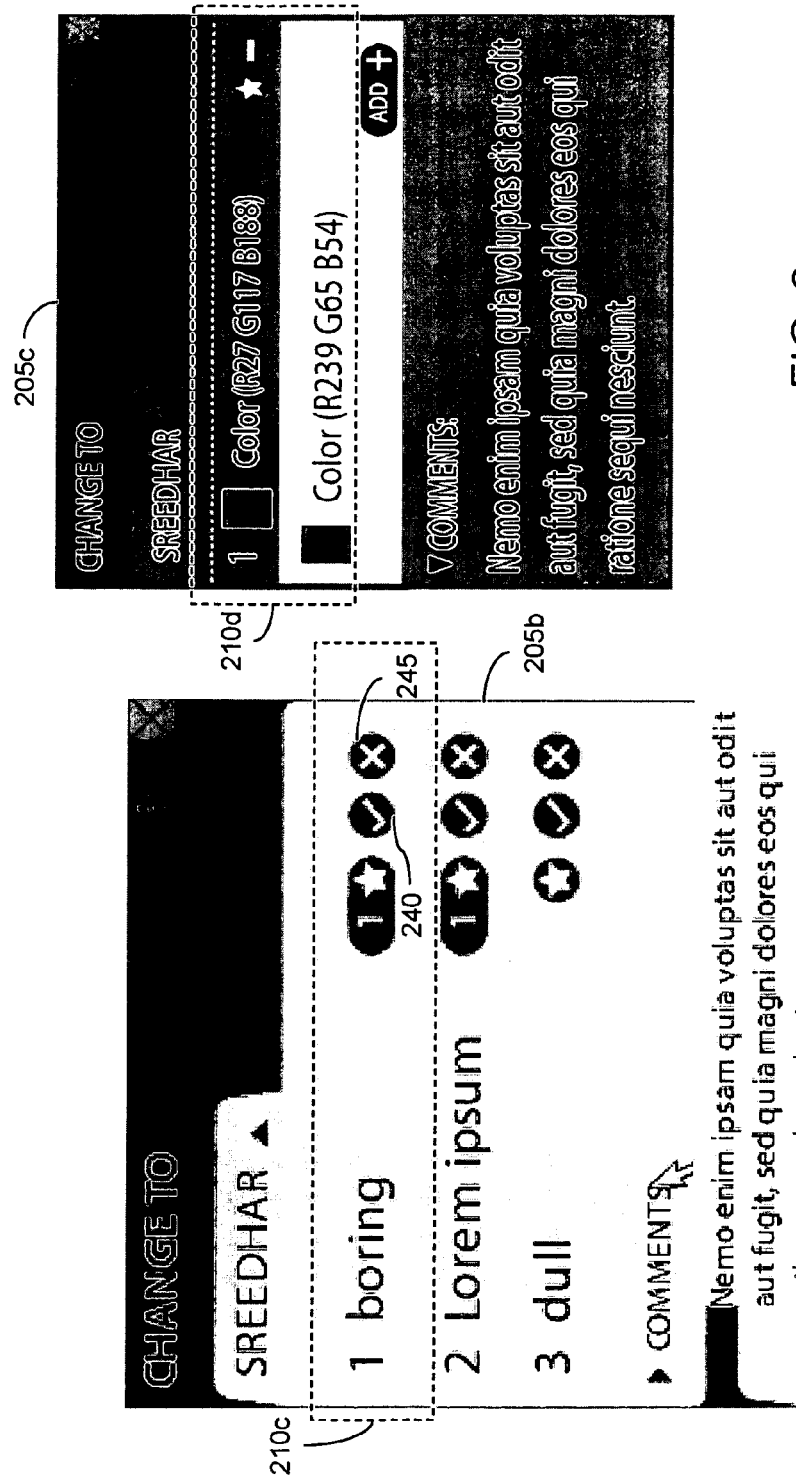

FIGS. 2a, 2b and 2c are exemplary representations of a first hybrid commenting element 205a, a second hybrid commenting element 205b and a third hybrid commenting element 205c in accordance with an embodiment of the invention.

Each hybrid commenting element may include a plurality of sections. In an embodiment of the invention, the plurality of sections includes a first section, for example, a suggestion section and a second section, for example, a support section. The plurality of sections may be stacked and may be collapsible or expandable.

First hybrid commenting element 205a includes one or more suggestion sections including a first suggestion section 210a and a first suggestion section 210b, and one or more support sections including a first support section 215a and a first support section 215b. First support section 215a is associated or logically related with first suggestion section 210a, and first support section 215b is associated or logically related with first suggestion section 210b.

In an embodiment of the invention, each hybrid commenting element includes one suggestion section and one support section corresponding to one user. For example, first hybrid commenting element 205a includes first suggestion section 210b and first support section 215b for user "Arun". A new user may add another suggestion section and support section by using, for example, an icon 235.

In another embodiment of the invention, each hybrid commenting element may include multiple suggestion sections and multiple comment sections corresponding to one user.

In an embodiment of the invention, each suggestion section, for example, first suggestion section 210b is adaptable to receive one or more suggestions. Further, suggestions may be added in first suggestion section 210b using, for example, an icon 225. First suggestion section 210b may be resizable based on the number of suggestions added in first suggestion section 210b. First suggestion section 210b may include icons, for example, an icon 230 for setting preferences of the one or more suggestions.

In an embodiment of the invention, each suggestion section may include one or more attributes of an object being reviewed. For example, a third suggestion section 210d of third hybrid commenting element 205c includes attribute "Color" for a drawing. If the object is an audio then icon "record" may be included for recording another voice.

It will be appreciated that the one or more attributes may vary with type of the object. For example, if the object is a video or an image then the one or more attributes may include pixel values.

In an embodiment of the invention, each suggestion section includes one or more icons corresponding to one or more functions associated with that suggestion section. The one or more icons may vary based on rights of a user. For example, if the user is an author of the object then a second suggestion section 210c of second hybrid commenting element 205b may include icon 240 for accepting a suggestion or icon 245 for rejecting.

In an embodiment of the invention, the one or more suggestions may include a replacement for the object, an insertion, a size variation of the object or any other way of suggesting change to the object.

In an embodiment of the invention, each support section is adaptable to receive a support for the one or more suggestions of corresponding suggestion section. For example, first support section 215b includes a support for the one or more suggestions of first suggestion section 210b.

In an embodiment of the invention, the support may include a note, a comment, a reason, or a thought explaining, illustrating, criticizing, questioning, expanding the one or more suggestions or in any other way relating to the one or more suggestions. In some embodiments of the invention, the support may also include observation or remark relating to the object.

It will be appreciated that additional functions may be selected for each suggestion section or each support section using, for example, icon 220.

It will also be appreciated that the one or more suggestion sections may be structurally integrated or separated with their respective support sections.

It will also be appreciated that any hybrid commenting element may also include several other sections, for example, digital signature section, hyperlink section and other sections for including various concepts associated with the object.

Various hybrid commenting elements may be generated using a system including various modules. The system including various modules for generating the hybrid commenting elements is explained in detail in conjunction with FIG. 3.

Figure 3:
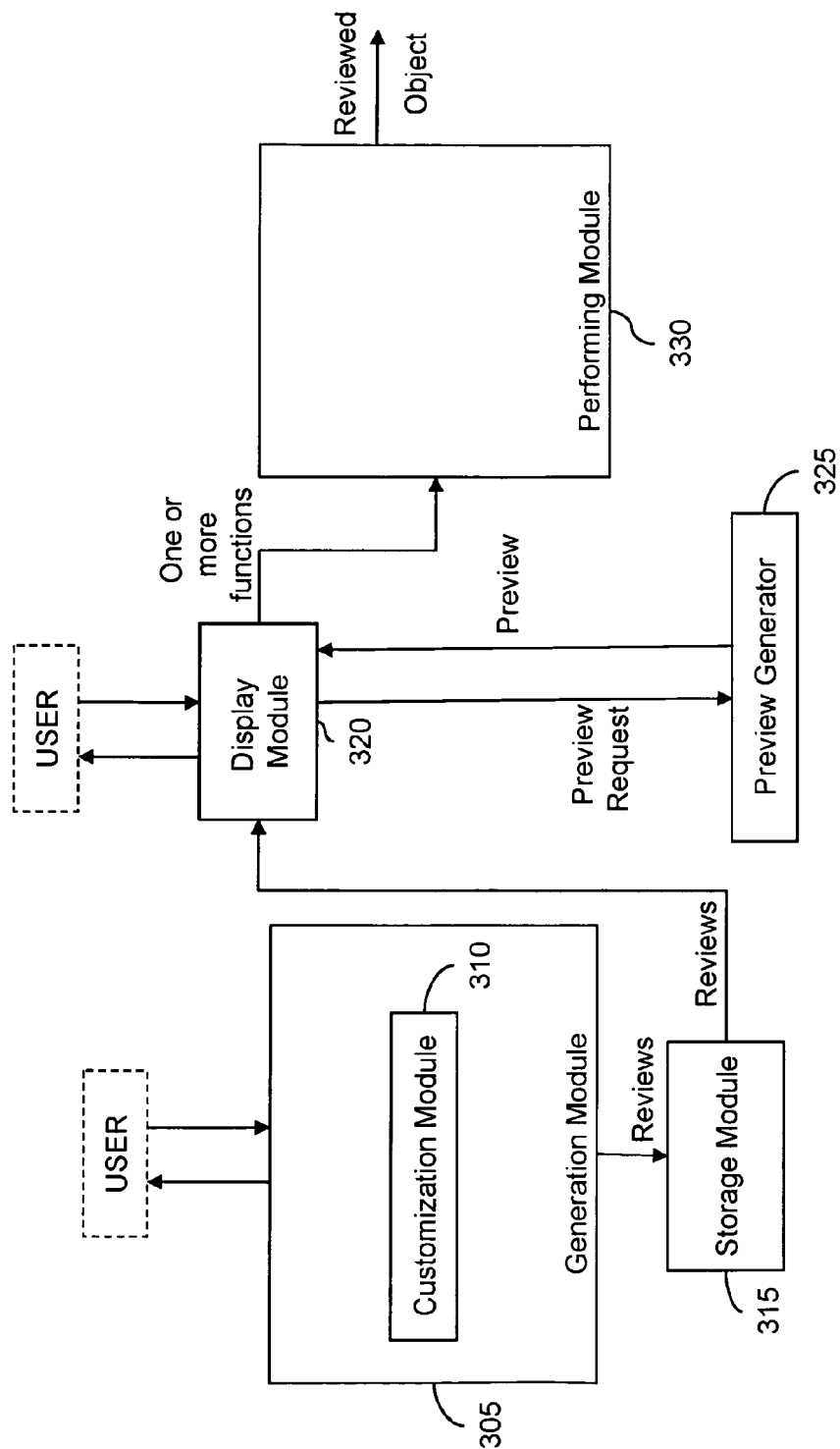
FIG. 3 is a block diagram of a system in accordance with an embodiment of the invention.

FIG. 3 is a block diagram of a system 300 in accordance with an embodiment of the invention. System 300 includes a generation module 305 including a customization module 310, a storage module 315, a display module 320, a preview generator 325, and a performing module 330.

Generation module 305 generates a plurality of sections corresponding to an object. The object may be selected by a user, for example, a reviewer. The plurality of sections includes a suggestion section and a support section. In an embodiment of the invention, the plurality of sections is included in a hybrid commenting element.

In an embodiment of the invention, generation module 305 includes customization module 310 for customizing the suggestion section. The customizing may be performed based on type of the object. For example, in case the object is a drawing then the suggestion section may include a panel of color swatches. Various parameters may be appended to the suggestion section based on the type of the object.

It will be appreciated that the suggestion section may be customized automatically based on the type of the object or options may be provided to the user for customizing the suggestion section or both.

Storage module 315 receives and stores reviews for the object. The reviews may include one or more suggestions and a support. The reviews may be received directly from the user or through generation module 305.

In some embodiments of the invention, storage module 315 may be included in generation module 305 or generation module 305 may perform functions of storage module 315.

Display module 320 displays the reviews including one or more icons corresponding to one or more functions associated with the suggestion section. The one or more icons may be displayed based on rights of a user. For example, if the user is an author or object creator then accepting icon and rejecting icon may be displayed. If the user is the same reviewer then icons corresponding to altering the one or more suggestions and the comment may be displayed.

In some embodiments of the invention, display module 320 may be included in generation module 305 or generation module 305 may perform functions of display module 320.

Preview generator 325 generates a preview corresponding to the one or more suggestions. In an embodiment of the invention, preview generator 325 generates the preview in response to an input from a user, for example, when the user clicks on a preview generating icon or takes mouse over a suggestion.

It will be appreciated that options, for example, printing the preview may also be provided.

Performing module 330 performs one or more functions associated with the suggestion section. In an embodiment of the invention, the one or more functions are performed independent of the support section. The one or more functions may include modifying the object by accepting a suggestion. In an embodiment of the invention, a user, for example, an author selects an icon and performing module 330 performs the function corresponding to the icon.

In some embodiments of the invention, preview generator 325 may be included in performing module 330 or performing module 330 may perform functions of preview generator 325.

Figure 4:
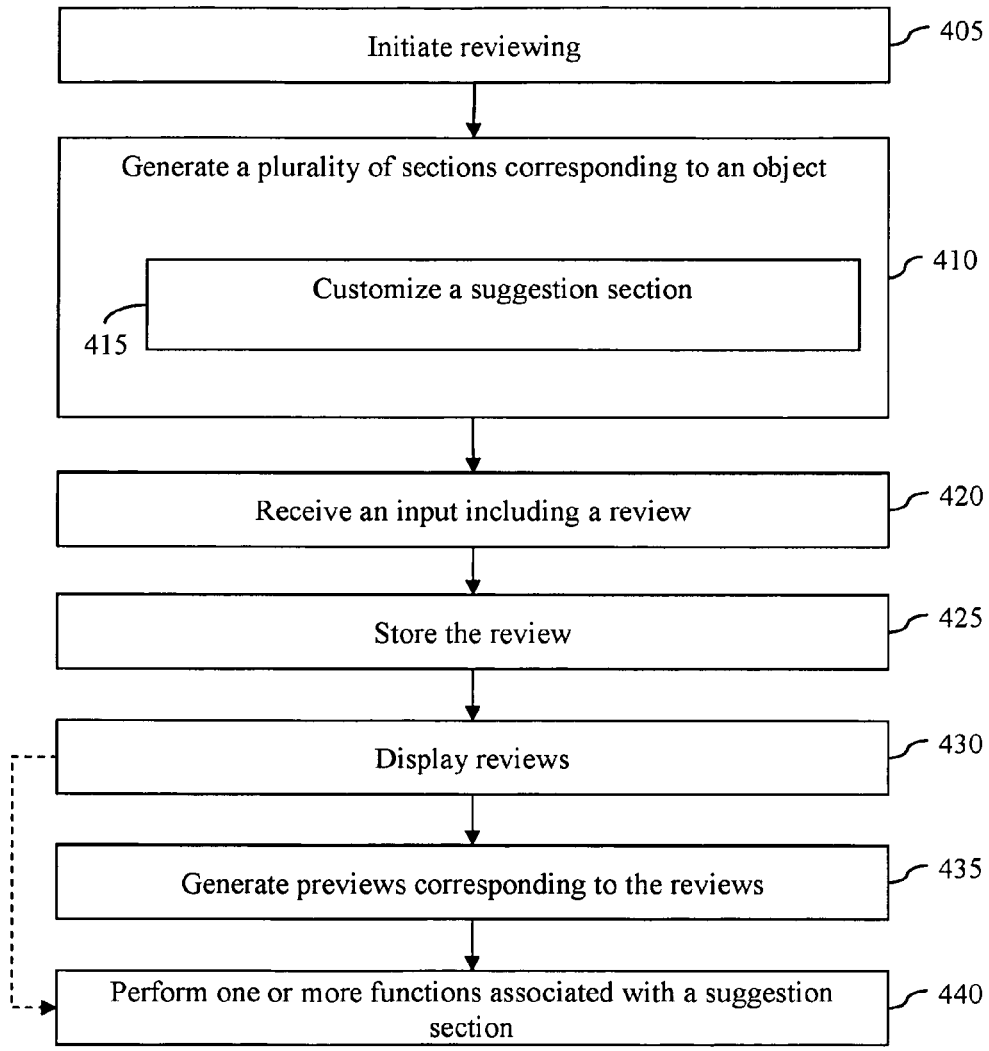
FIG. 4 is a flowchart illustrating a method for reviewing objects in accordance with an embodiment of the invention.

FIG. 4 is a flowchart illustrating a method for reviewing objects in accordance with an embodiment of the invention.

At step 405, reviewing is initiated. In an embodiment of the invention, the reviewing may be initiated by selection of an option, for example, "Review", "Hybrid Review", "Insert Hybrid Comment", "Hybrid Commenting" or "Change To". In another embodiment of the invention, the reviewing may be initiated by selection of an object followed by selection of the option. In yet another embodiment of the invention, the object might already have been reviewed by some other user. In such case, the reviewing may be initiated by selection of an icon, for example, "New Changes" or "New suggestion".

Thereafter, at step 410, a plurality of sections is generated corresponding to the object. In an embodiment of the invention, the plurality of sections include a first section, for example, a suggestion section and a second section, for example, a support section. The suggestion section is adaptable to receive the one or more suggestions. The support section is adaptable to receive the support for the one or more suggestions.

In an embodiment of the invention, generating the plurality of sections includes dividing an existing section, for example, a comment box into the plurality of sections. For example, in cases where the object is already reviewed by some other user and a comment is provided in the comment box then the comment box may be divided into an empty suggestion section and into the support section including the comment of the comment box.

In an embodiment of the invention, size of the plurality of sections may vary based on the number of suggestions, length of suggestion or length of the comment. In another embodiment of the invention, an option may be provided to the user to adjust the size of the plurality of sections as per the user's need.

Examples of the plurality of sections includes but are not limited to suggestion section, support section, comment section, thought section, digital signature section, hyperlink section and other sections for including various concepts associated with the object.

In an embodiment of the invention, step 410 includes performing step 415. At step 415, the suggestion section is customized. In an embodiment of the invention, the suggestion section may be customized based on type of the object. For example, in case the object is a drawing then the suggestion section may include a panel of color swatches and in case the object is an audio then the suggestion section may include a record panel. The type of the object may already be known to an application including the object. In some embodiments of the invention, based on the type of the object the suggestion section may automatically be populated with parameters associated with the object. In other embodiments of the invention, various parameters associated with the object may be appended to the suggestion section by the user. Examples of the parameters include but are not limited to font size, font type, font color and other attributes of the object.

In an embodiment of the invention, the suggestion section may be customized by providing options to the users to set preferences for the one or more suggestions. For example, by providing an icon which a user may select to indicate preference.

It will be appreciated that other sections may also be customized automatically or by user based on type of section.

At step 420, an input is received for at least one section of the plurality of sections. In an embodiment of the invention, the input includes a review. The review may include combination of the one or more suggestions and the support, the one or more suggestions or only the support, for example, a comment.

In an embodiment of the invention, the one or more suggestions may include a replacement for the object, an insertion, a size variation of the object or any other way of suggesting change to the object. For example, if the object is an audio then the one or more suggestions may include a voice recording for replacing a portion of the audio. The one or more suggestions and corresponding supports may be inserted at various intervals in the audio. An example application including video commenting is co-pending U.S. patent application Ser. No. 11/705,983 which is assigned to Adobe Systems Incorporated, assignee of this application and is incorporated herein by reference.

In an embodiment of the invention, the support may include a note, a comment, a reason, or a thought explaining, illustrating, criticizing, questioning, expanding the one or more suggestions or in any other way relating to the one or more suggestions. In some embodiments of the invention, the support may also include observation or remark relating to the object.

In some embodiments of the invention, an option may be provided to the user to select a color or other attributes in which the suggestions proposed by the user appears. The user may also set preferences for the one or more suggestions using, for example, an icon. In an embodiment of the invention, the user, for example, a reviewer may also set preferences for the one or more suggestions suggested by some other user.

At step 425, the review including the one or more suggestions and the support is stored. In an embodiment of the invention, the review is stored along with an electronic document including the object. In another embodiment of the invention, the review may be separately stored in different file formats, for example, Extensible mark-up language (XML) format.

It will be appreciated that reviews corresponding to all objects in the electronic document may be saved automatically once the reviews are inserted or once the electronic document is closed or based on user action, for example, clicking on a "Save" icon or "Publish" icon. The reviews may also be saved automatically at certain intervals as set by the user. The reviews may also be saved in other file formats based on need of the user. Further, other existing techniques may also be used for storing, for example, storing the reviews in the server.

In an embodiment of the invention, the plurality of sections, at step 410, may be generated in parts based on inputs of a user. For example, the user may select an option for generating support section. Steps 415 to 425 may then be performed for the support section and the user may then select an option for generating the suggestion section. Steps 415 to 425 may then also be performed after the suggestion section is generated.

Thereafter, at step 430, the reviews are displayed. In an embodiment of the invention, the reviews for the object from all the users are displayed together upon accessing the electronic document including the object. In another embodiment of the invention, when the electronic document is shared on a server the reviews update may happen dynamically. For example, the reviews entered by the user may be available to other users accessing the electronic document in real time. In yet another embodiment of the invention, when the electronic document is shared on a server the reviews update may happen at certain intervals as set by the user. In still another embodiment of the invention, the reviews may be displayed upon importing the reviews saved in other file formats. In still another embodiment of the invention, the reviews may be displayed upon user activities, for example, clicking on "Display" icon or "Publish" icon. In still another embodiment of the invention, the reviews may be synced and then displayed when the user comes online.

In an embodiment of the invention, reviews display includes displaying one or more icons corresponding to one or more functions associated with the one or more suggestions. The one or more icons may be displayed based on rights of a user. For example, if the user is an author or object creator then accepting icon and rejecting icon may be displayed. If the user is the same reviewer then icons corresponding to altering the one or more suggestions and the comment may be displayed. If the user is a new reviewer then icons corresponding to proposing new suggestions and icons corresponding to setting preferences for suggestions from other reviewers may be displayed.

In an embodiment of the invention, reviews display includes retrieving the reviews, for example, through Really Simple Syndication (RSS). The reviews may be retrieved by using, for example, an icon. In another embodiment of the invention, if the reviews were stored in an offline mode at step 425 then the reviews may be published or other reviews may be retrieved when the user comes online and may then be displayed.

In an embodiment of the invention, step 425 may be included in step 430 and vice versa.

In an embodiment of the invention, at step 435, previews corresponding to the one or more suggestions may be generated. In an embodiment of the invention, the previews may be generated when a user takes cursor over the one or more suggestions. In another embodiment of the invention, the preview may be generated by using, for example, an icon. The previews may vary based on the suggestions. For example, if the suggestion includes replacing an audio with a new audio then preview may include playing the new audio while if the suggestion includes changing color in a drawing then preview may include the drawing with new color.

It will be appreciated that options, for example, printing the preview may also be provided.

In an embodiment of the invention, step 435 may be bypassed and step 440 may be performed. At step 440, the one or more functions associated with the first section, for example, the suggestion section including the one or more suggestions are performed. Examples of the one or more functions include but are not limited to accepting the suggestion, rejecting the suggestion, proposing a new suggestion and replying by inserting a comment without any suggestion.

In an embodiment of the invention, a user, for example, an author selects a function by using, for example, an icon and the function corresponding to the icon is then performed.

In an embodiment of the invention, the one or more functions associated with the first section, for example, the suggestion section including the one or more suggestions are performed independent of other sections, for example, the support section including the support for the one or more suggestions.

In an embodiment of the invention, other sections, for example, the support section may be discarded after the one or more functions associated with the suggestion section are performed. For example, the comment may be discarded once the replacement is accepted.

In an embodiment of the invention, one or more steps of the method described in FIG. 4 may be implemented using a machine-readable medium. Examples of the machine-readable medium include but are not limited to memory devices, tapes, disks, cassettes, integrated circuits, servers, magnetic media, optical media, online software, download links, installation links, and online links.

Figure 5:
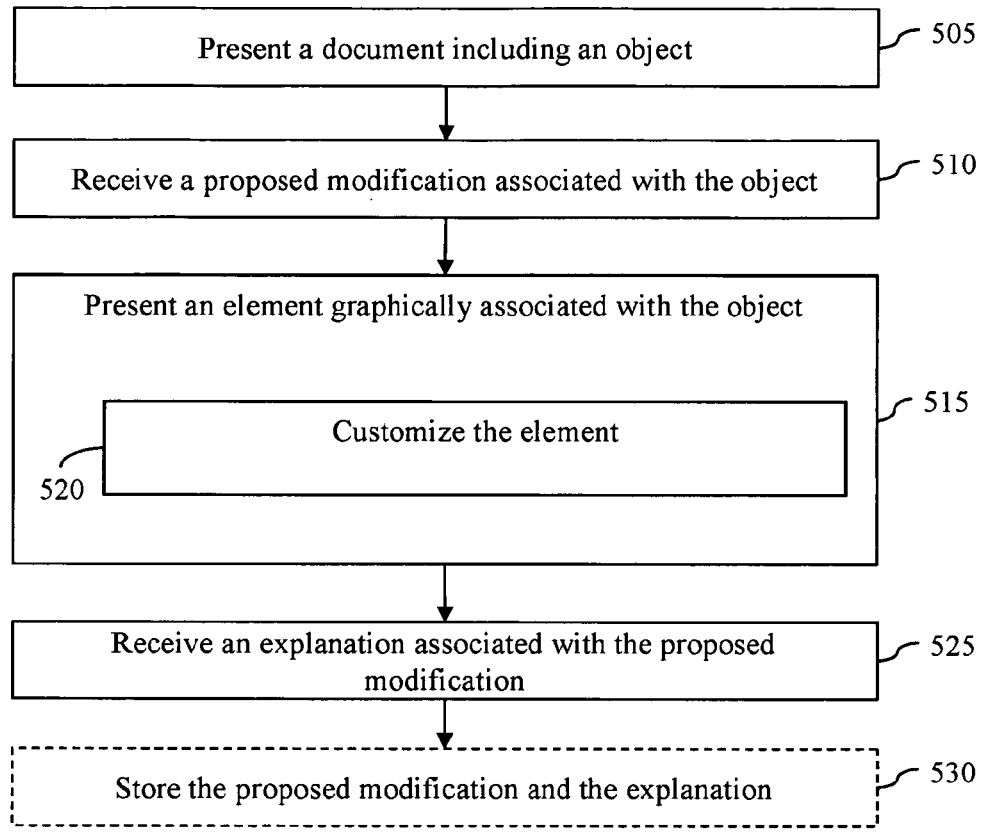
FIG. 5 is a flowchart illustrating a method for reviewing objects in accordance with another embodiment of the invention.

FIG. 5 is a flowchart illustrating a method for reviewing objects in accordance with another embodiment of the invention.

At step 505, a document including an object is presented.

Thereafter, at step 510, a proposed modification associated with the object is received. In an embodiment of the invention, a user input including the proposed modification is received. The user may select an object and start typing the proposed modification which may be considered as the input. Examples of the proposed modification include but are not limited to a replacement for the object, an insertion, a size variation of the object or any other way of suggesting modification to the object.

At step 515, an element graphically associated with the object is presented. In an embodiment of the invention, the element includes a first section, for example, a suggestion section and a second section, for example, a support section. The suggestion section is adaptable to receive proposed modifications. The support section is adaptable to receive explanations for the proposed modifications.

In an embodiment of the invention, an application running the document detects the input of the user and automatically populates the first section of the element and presents the element.

In an embodiment of the invention, step 515 includes, performing step 520. At step 520, the element including the first section is customized. In an embodiment of the invention, the first section may be customized based on type of the object. For example, in case the object is a drawing then the first section may include a panel of color swatches and in case the object is an audio then the first section may include a record panel. The type of the object may already be known to the application including the object. In some embodiments of the invention, based on the type of the object the first section may automatically be populated with parameters associated with the object. In other embodiments of the invention, various parameters associated with the object may be appended to the first section by the user. Examples of the parameters include but are not limited to font size, font type, font color and other attributes of the object.

In an embodiment of the invention, the first section may be customized by providing options to the users to set preferences for the one or more suggestions. For example, by providing an icon which a user may select to indicate preference.

It will be appreciated that other sections may also be customized automatically or by user based on type of section.

At step 525, an explanation associated with the proposed modification is received. In an embodiment of the invention, the explanation may include a note, a comment, a reason, or a thought explaining, illustrating, criticizing, questioning, expanding the proposed modification or in any other way relating to the proposed modification. In some embodiments of the invention, the explanation may also include observation or remark relating to the object.

It will be appreciated that one or more proposed modifications and explanations may be received for the object.

In some embodiments of the invention, at step 530, the proposed modifications and the explanations are stored. In an embodiment of the invention, the proposed modifications and the explanations are stored along with the document including the object. In another embodiment of the invention, the proposed modifications and the explanations may be separately stored in different file formats, for example, Extensible mark-up language (XML) format.

It will be appreciated that the proposed modifications and the explanations corresponding to the object in the document may be saved automatically once the proposed modifications and the explanations are inserted or once the document is closed or based on user action, for example, clicking on a "Save" icon or "Publish" icon. The proposed modifications and the explanations may also be saved automatically at certain intervals as set by the user. The proposed modifications and the explanations may also be saved in other file formats based on need of the user. Further, other existing techniques may also be used for storing, for example, storing the proposed modifications and the explanations in the server.

It will be appreciated that size of the first section and the second section may vary based on the number of the proposed modifications, length of the proposed modifications or length of the explanations. It will also be appreciated that an option may be provided to the user to adjust the size of the first section and the second section as per the user's need.

It will be appreciated that other sections for example digital signature section and hyperlink section may also be included.

In an embodiment of the invention, one or more steps of the method described in FIG. 5 may be implemented using a machine-readable medium. Examples of the machine-readable medium include but are not limited to memory devices, tapes, disks, cassettes, integrated circuits, servers, magnetic media, optical media, online software, download links, installation links, and online links.

Figure 6:
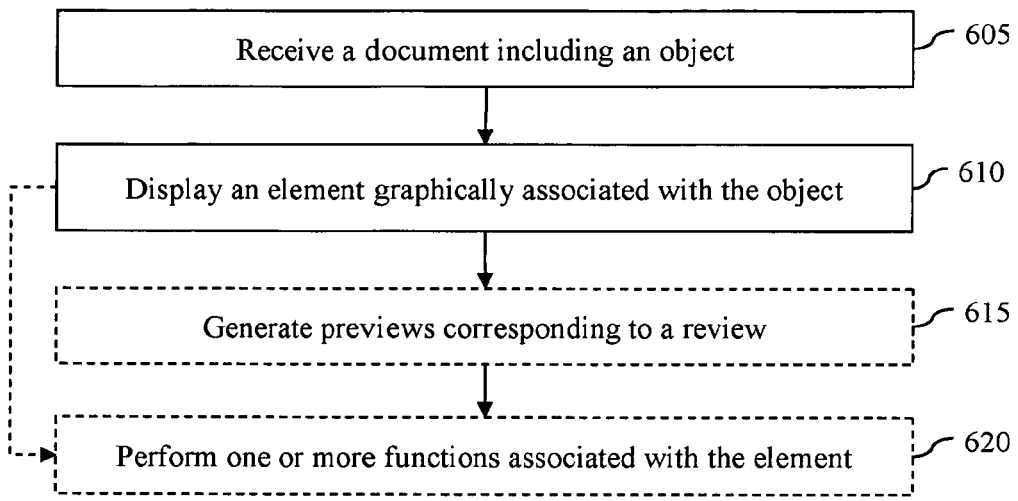
FIG. 6 is a flowchart illustrating a method for reviewing objects in accordance with yet another embodiment of the invention.

FIG. 6 is a flowchart illustrating a method for reviewing objects in accordance with yet another embodiment of the invention.

At step 605, a document including an object is received.

Thereafter, at step 610, an element graphically associated with the object is displayed. In an embodiment of the invention, the element includes a first section, for example, a suggestion section including one or more proposed modifications and a second section, for example, a support section including one or more explanations for the one or more proposed modifications. The one or more proposed modifications and the one or more explanations may be referred to as reviews.

In an embodiment of the invention, various elements including the reviews for the object from all the users are displayed together upon accessing the document including the object. In another embodiment of the invention, when the document is shared on a server the reviews update may happen dynamically. For example, the reviews entered by the user may be available to other users accessing the document in real time. In yet another embodiment of the invention, when the document is shared on a server the reviews update may happen at certain intervals as set by the user. In still another embodiment of the invention, the reviews may be displayed upon importing the reviews saved in other file formats. In still another embodiment of the invention, the reviews may be displayed upon user activities, for example, clicking on "Display" icon or "Publish" icon.

In an embodiment of the invention, displaying the element includes displaying one or more icons. The one or more icons may be displayed based on rights of a user. For example, if the user is an author or object creator then a first icon for accepting a proposed modification and a second icon for rejecting the proposed modification may be displayed. If the user is the same reviewer then icons corresponding to altering the proposed modification and the explanations may be displayed. If the user is a new reviewer then third icon corresponding to proposing new modifications and other icons corresponding to setting preferences for previously proposed modifications from other reviewers may be displayed.

In an embodiment of the invention, at step 615, previews corresponding to the proposed modifications may be generated. In an embodiment of the invention, the previews may be generated when a user takes cursor over the proposed modifications. In another embodiment of the invention, the preview may be generated by using, for example, an icon.

It will be appreciated that options, for example, printing the preview may also be provided.

In some embodiments of the invention, step 615 may be bypassed and step 620 may be performed. At step 620, one or more functions associated with the element including the first section, for example, the suggestion section is performed. Examples of the one or more functions include but are not limited to accepting the proposed modification, rejecting the proposed modification, proposing a new modification and replying by inserting a comment without any modification. In an embodiment of the invention, a user, for example, an author selects a function by using, for example, an icon and the function corresponding to the icon is then performed.

In an embodiment of the invention, the one or more functions associated with the first section, for example, the suggestion section is performed independent of other sections, for example, the support section.

In an embodiment of the invention, other sections, for example, the support section may be discarded after the one or more functions associated with the first section are performed. For example, the comment may be discarded once the proposed modification is accepted.

In an embodiment of the invention, one or more steps of the method described in FIG. 6 may be implemented using a machine-readable medium. Examples of the machine-readable medium include but are not limited to memory devices, tapes, disks, cassettes, integrated circuits, servers, magnetic media, optical media, online software, download links, installation links, and online links.

The support section including thoughts behind the one or more suggestions lends context to the one or more suggestions and helps in reviewing the objects efficiently. The setting of preferences for the one or more suggestions by multiple reviewers helps author in making decision.

While embodiments of the invention are disclosed in terms of exemplary embodiments, it can be practiced in a number of ways as defined by the scope of the appended claims. Additionally, various features of embodiments of the invention can be modified in a myriad of ways to achieve the goal of reviewing objects.

We claim:

1. A method, comprising:
    displaying, by an application, content of an electronic document;

receiving input selecting a hybrid commenting option within the application displaying the electronic content;

in response to the selection of the hybrid commenting option, generating a hybrid commenting element comprising a plurality of sections corresponding to an object of the electronic document, wherein the plurality of sections comprises:

a suggestion section configured to receive user input suggesting a change to the object, and a support section configured to receive user input commenting on the suggested change;

receiving user input to the suggestion section for a suggested change to the object, and receiving user input to the support section including a comment on the suggested change;

storing the received user input as part of the electronic document; and sending the electronic document including the stored input to a recipient over a network, wherein the stored input of the electronic document is usable to perform one or more functions associated with the suggestion section, wherein the one or more functions comprise accepting or rejecting the suggested change to the object in the electronic document, and wherein the stored input of the electronic document is further usable to display the comment in conjunction with the suggested change.

2. The method of claim 1, wherein the generating comprises:
customizing the suggestion section based on a type of the object.

3. The method of claim 1, wherein the generating comprises:
dividing an existing section for the object into the plurality of sections.

4. The method of claim 1, wherein the one or more functions includes a modification of the object.

5. The method of claim 1 further comprising:
varying size of the plurality of sections.

6. The method of claim 1 further comprising:
generating a preview corresponding to one or more suggestions of the suggestion section.

7. A method, comprising:
presenting, by an application, an object of a document;
receiving input selecting a hybrid commenting option within the application presenting the object;
in response to the selection of the hybrid commenting option, creating a hybrid commenting element comprising first and section sections corresponding to the object of the document, wherein the hybrid commenting element includes:

a first section configured to receive user input suggesting a proposed change associated with the object; and a second section including a text input field configured to receive user input commenting on the suggested change, wherein the element is graphically associated with the object as part of the same application;

receiving a proposed modification associated with the object;

receiving an explanation associated with the proposed modification in the text input field of the second section;

storing the proposed modification and the explanation as part of the document; and sending the document including the stored proposed modification and explanation to a recipient over a network, wherein the stored proposed modification and explanation of the document is usable to perform one or more functions associated with the first section, wherein the one or more functions comprise accepting or rejecting the proposed modification to the object in the document, and wherein the stored proposed modification and explanation of the document is further usable to display the explanation in conjunction with the proposed modification.

8. A method, comprising:
receiving a document comprising an object; and
displaying, by an application, content of the document including the object;
receiving input selecting a hybrid commenting option within the application displaying the electronic content;
in response to the selection of the hybrid commenting option, displaying, in the application, a hybrid commenting element graphically associated with the object, the element comprising:

a first section configured to receive user input suggesting a change to the object, and a second section configured to receive user input commenting on the suggested change;

receiving user input to the suggestion section for a suggested change to the object, and receiving user input to the support section including a comment on the suggested change;

storing the received user input as part of the electronic document; and sending the electronic document including the stored input to a recipient over a network, wherein the stored input of the electronic document is usable to perform one or more functions associated with the suggestion section, wherein the one or more functions comprise accepting or rejecting the suggested change to the object in the electronic document, and wherein the stored input of the electronic document is further usable to display the comment in conjunction with the suggested change wherein the suggested change and the comment were generated by the same application performing said displaying.

9. The method of claim 8, wherein displaying the element comprises:
displaying a first icon to accept the suggested change;
displaying a second icon to reject the suggested change; and
displaying a third icon to reply to the suggested change.

10. A non-transitory machine-readable medium comprising instructions operable to cause a programmable processor to perform:
displaying, by an application, content of an electronic document;
receiving input selecting a hybrid commenting option within the application displaying the electronic content;
in response to the selection of the hybrid commenting option, generating a hybrid commenting element comprising a plurality of sections corresponding to an object of the electronic document, wherein the plurality of sections comprises:

a suggestion section configured to receive user input suggesting a change to the object, and a support section configured to receive user input commenting on the suggested change;

receiving user input to the suggestion section for a suggested change to the object, and receiving user input to the support section including a comment on the suggested change;

storing the received user input as part of the electronic document; and sending the electronic document including the stored input to a recipient over a network, wherein the stored input of the electronic document is usable to perform one or more functions associated with the suggestion section, wherein the one or more functions comprise accepting or rejecting the suggested change to the object in the electronic document, and wherein the stored input of the electronic document is further usable to display the comment in conjunction with the suggested change.

11. The machine-readable medium of claim 10, wherein the generating comprises:
customizing the suggestion section based on a type of the object.

12. The machine-readable medium of claim 10, wherein the generating comprises:
dividing an existing section for the object into the plurality of sections.

13. The machine-readable medium of claim 10, wherein the one or more functions includes a modification of the object.

14. The machine-readable medium of claim 10 further comprising:
instructions operable to cause a programmable processor to perform varying size of the plurality of sections.

15. The machine-readable medium of claim 10, wherein the instructions are further operable to cause the programmable processor to perform generating a preview corresponding to one or more suggestions of the suggestion section.

16. A system, comprising:
a memory; and
a processor coupled to the memory, wherein the memory comprises program instructions executable by the processor to implement:
displaying content of an electronic document;
receiving input selecting a hybrid commenting option;
in response to the selection of the hybrid commenting option, generating a hybrid commenting element comprising a suggestion section and a support section, wherein the suggestion and support sections correspond to an object of the electronic document;
displaying the suggestion section for receiving one or more suggestions corresponding to an object as part of an object editing application; and
displaying the support section associated with the suggestion section for receiving support for the one or more suggestions as part of the same object editing application;
receiving user input to the suggestion section for a suggested change to the object, and receiving user input to the support section including a comment on the suggested;
storing the received user input as part of the electronic document; and
sending the electronic document including the stored input to a recipient over a network, wherein the stored input of the electronic document is usable to perform one or more functions associated with the suggestion section, wherein the one or more functions comprise accepting or rejecting the suggested change to the object in the electronic document, and wherein the stored input of the electronic document is further usable to display the comment in conjunction with the suggested change.

17. The system of claim 16, wherein the suggestion section comprises:
one or more attributes associated with the object.

18. The system of claim 16, wherein the suggestion section comprises:
one or more icons corresponding to one or more functions associated with the suggestion section.

19. A system, comprising:
a memory; and
a processor coupled to the memory, wherein the memory comprises program instructions executable by the processor to implement:
an object editing application that includes:
a generation module for generating a plurality of sections corresponding to an object of a document in response to a selection of a hybrid commenting option within the object editing application, wherein the plurality of sections comprises:
a suggestion section configured to receive user input suggesting a change to the object, and
a support section configured to receive user input commenting on the suggested change;
a storage module for storing, as part of the document, a suggested change received by the suggestion section for the object and a comment on the suggested change; and
a performing module for performing one or more functions associated with the suggestion section.

20. The system of claim 19, wherein the generating module comprises:
a customization module for customizing the suggestion section based on a type of the object.

21. The system of claim 19, wherein the object editing application further includes a display module for displaying one or more icons corresponding to the one or more functions.

22. The system of claim 19, wherein the object editing application further includes a preview generator for generating a preview corresponding to one or more suggestions of the suggestion section.

23. The system of claim 21, wherein the one or more icons depend on rights of a user of the system.

24. The method of claim 8, wherein displaying the element comprises displaying one or more icons depending on user rights.

* * * * *